United States Patent [19]
Curtis et al.

[11] 3,868,520
[45] Feb. 25, 1975

[54] TURBINE-GENERATOR WATER-COOLED ROTOR SHAFT LINER RESTRAINT

[75] Inventors: Little P. Curtis, Monroeville; Paul R. Heller, Murryville, both of Pa.

[73] Assignee: Westinghouse Electric Corporation, Pittsburgh, Pa.

[22] Filed: Jan. 18, 1974

[21] Appl. No.: 434,755

[52] U.S. Cl. .................................. 310/61, 310/64
[51] Int. Cl. ................................................ H02k 1/32
[58] Field of Search ............ 310/52, 54, 53, 58, 59, 310/61, 64, 65; 165/185, 177–183

[56] References Cited
UNITED STATES PATENTS

| 3,131,321 | 4/1964 | Gibbs | 310/54 |
|---|---|---|---|
| 3,363,122 | 1/1968 | Hoover | 310/54 |
| 3,497,736 | 2/1970 | Cuny | 310/54 |
| 3,504,207 | 3/1970 | Tjernstrom | 310/54 |
| 3,686,522 | 6/1972 | Konovalov | 310/54 |
| 3,733,502 | 5/1973 | Curtis | 310/61 |
| 3,740,596 | 6/1973 | Curtis | 310/54 |
| 3,742,266 | 6/1973 | Heller | 310/54 |

Primary Examiner—R. Skudy
Attorney, Agent, or Firm—G. H. Telfer

[57] ABSTRACT

A water-cooled rotor for a large turbine generator in which the rotor passages are protected against corrosion by liners of stainless steel or other corrosion resistant material. In order to reduce the stresses in the liners due to differential thermal expansion, the liners are prestressed in tension against a concentric outer tube.

10 Claims, 4 Drawing Figures

FIG. 1

TURBINE-GENERATOR WATER-COOLED ROTOR SHAFT LINER RESTRAINT

BACKGROUND OF THE INVENTION

1. Field of the Invention

The present invention relates to the cooling of dynamoelectric machines, and more particularly to a liquid cooled rotor for machines of large size such as turbine generators.

2. Description of the Prior Art

Large turbine generators are usually of the inner cooled, or direct cooled, construction, in which a coolant fluid is circulated through ducts in the stator and rotor slots in direct thermal relation with the current-carrying conductors inside the ground insulation. This type of construction provides a very effective cooling system and has made it possible to greatly increase the maximum ratings obtainable in large generators without exceeding the permissible limits of physical size. The coolant used in these machines has usually been hydrogen which fills the gas-tight housing and is circulated by a blower on the rotor shaft through the ducts of the stator and rotor windings and through suitable ducts in the stator core.

As the maximum ratings required in large generators have continued to increase, it has become necessary to further improve the cooling of these machines in the largest sizes. A substantial improvement in cooling can be obtained by use of more efficient coolant fluids such as liquids. This has been done in stators by circulating a liquid coolant, such as water, through hollow strands spaced through the stator winding. A substantial further improvement can be obtained by applying liquid coolant to the rotor by circulating water or other suitable liquids through passages in the rotor windings.

There are many problems involved in circulating a liquid coolant through the rotor of a large generator. One of the most difficult problems is that of introducing the water into the rotor and discharging it therefrom. This is preferably done as close to the axis of the rotor as possible where the pressure in the liquid is at its lowest value. One suitable construction for this purpose is U.S. Pat. No. 3,733,502, issued to L. P. Curtis et al., and assigned to the assignee of the present invention. In this construction, the liquid is introduced through passages in the axial bore at one end of the rotor shaft. The coolant flows from these passages through radial passages to an annular distribution chamber on the rotor surface from which it is directed into the passages in the field winding conductors. At the discharge end of the rotor, the liquid flows from the conductors to an annular collection chamber and through radial passages to the central bore of the rotor. The coolant flows through the axial bore of the shaft and through a set of radial conduits into an annular discharge chamber. The coolant fluid is then discharged in any convenient manner.

Since the heated water flowing through the passages in the rotor can be quite corrosive, it is necessary to protect the steel of the rotor from corrosion. This is done by providing liners for all passages through which the water flows. These liners may be made of any suitable corrosion resistant material but are preferably made of stainless steel. When stainless steel liners are used in this manner, the liners become heated from the heated water flowing therethrough and tend to expand more than the steel rotor, both because the liners are at a somewhat higher temperature and because the liners have a greater coefficient of thermal expansion than the special alloy steel of which the rotor is usually made. Excessive stresses and possible damage can therefore result if provision is not made to accommodate this differential thermal expansion of the liner.

When a long tubular liner such as that employed in the bores of the rotor shaft is utilized, it is possible in some instances to provide for thermal expansion of the liner by anchoring it at one end only and permitting it to move axially relative to the shaft, as shown for example at the entrance end of the rotor in the above mentioned Curtis et al, patent. This solution of the problem, however, is not available where the liner must be attached at both ends to fixed points in the rotor. Thus, at the discharge end of the rotor, the water flows through a set of radial passages to the bore of the shaft and through the bore to a set of radial conduits near the end of the shaft through which it is discharged. The stainless steel liner in the shaft bore between the set of radial passages and the set of radial conduits must be anchored to radial stainless steel tubes in the passages at both ends, and if the liner is of substantial length, as is the case in the very large generators for which the invention is intended, the differential thermal expansion will be sufficient to stress the joints between the radial tubes and the liner beyond permissible limits. As an example, for a water temperature of 85°C (assuming 25°C at assembly) and an axial length of 70 inches, the total expansion of a stainless steel liner would be of the order of 0.070 inch. Such deflection would produce excessive stresses in the joints between the radial tubes and the liner.

Prior art has solved this problem by disposing a flexible bellows arrangement in the rotor liner intermediate between the radial passages and the radial conduits. The patent issued to Heller, et al., U.S. Pat. No. 3,740,595 and assigned to the assignee of the present invention discloses this method. An alternative method of accommodating or reducing the thermal expansion effects is to axially clamp the liner in the rotor shaft itself so that the mass of the shaft will limit the liner deflection and the differential expansion will be absorbed as elastic strain within the liner. However, if the resulting axial loads are not uniformly distributed over the end sections relative to the shaft center line, it is possible to generate internal moments that could deflect the shaft laterally by as much as 0.001 inch, resulting in considerable unbalance and vibration.

An object of this invention is to provide a method of accommodating or reducing the differential thermal expansion effects caused by the heating of the liners in the bore and passages of the rotor. Pre-stressing and insulating the corrosion resistant liners by means of a concentric outer tube reduces the net expansion of the liners produced by changes in water temperature, thus reducing the deflection and stresses required on the associated radial passages and conduits.

SUMMARY OF THE INVENTION

In accordance with the present invention, differential thermal expansion of the stainless steel liner in the shaft bore of a large rotor is provided for by prestressing the stainless steel liner in tension against a concentric brace tube. The liner and the brace tube are insulated from each other to provide a differential temperature between the inner liner and the outer brace tube. Depending on the materials utilized for the liner and the brace tube, the insulation further reduces the net displacement of the liner ends. As the temperature of the liner rises to correspond to the higher temperature of the water flowing through it, the resulting thermal expansion in the liner changes the reaction of the liner and the brace tube and produces a change of elastic strain. The resultant of the combined strain and thermal displacement will then provide a net movement in the liner that is less than the movement of the unrestrained liner alone, thus reducing the deflection and stress imposed on the radial passages and the radial conduits connected to the liner.

BRIEF DESCRIPTION OF THE DRAWINGS

The invention will be more fully understood from the following detailed description of an illustrative embodiment, taken in connection with the accompanying drawings, in which.

DESCRIPTION OF THE PREFERRED EMBODIMENT

Figure 1:
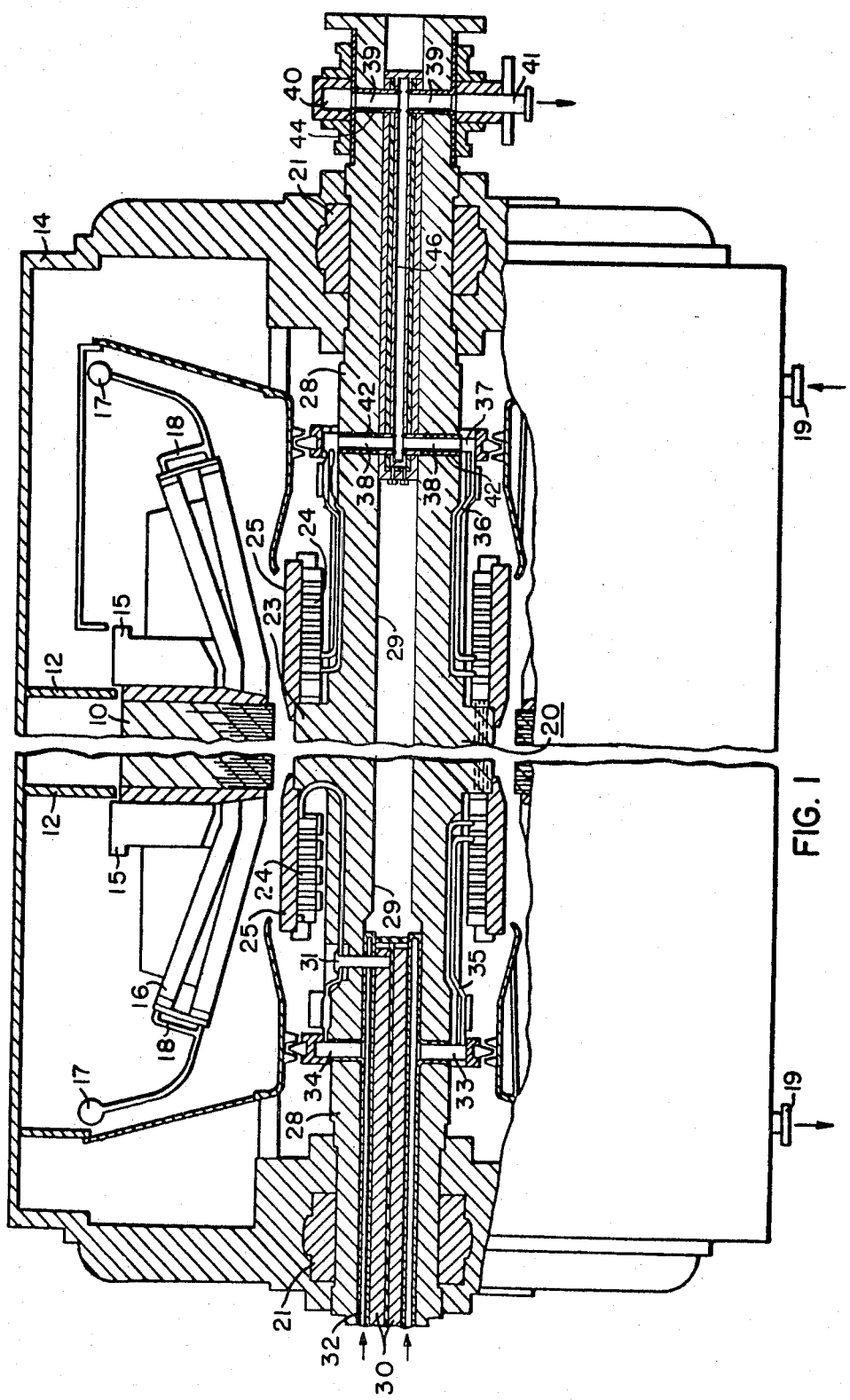
FIG. 1 is a view in longitudinal section, partially in elevation, of a turbine generator having a liquid cooled rotor embodying the invention.

Throughout the following description, similar reference characters refer to similar members in all figures of the drawing.

Referring now to the drawings, and FIG. 1 in particular, the invention is shown embodied in a large turbine generator of typical construction although it should be understood that the rotor of the present invention may be used in any desired type of dynamoelectric machine.

As shown, the generator has a stator core 10 supported by frame rings 12 in a substantially gas-tight outer housing 14. The stator core 10 is of the laminated construction, having a generally cylindrical bore extending therethrough, and the laminations are clamped between suitable end plates 15 in the usual manner. The stator core 10 has longitudinal slots in its inner periphery for reception of a stator winding 16 which may be of any suitable type but which is shown as being a liquid cooled winding. For this purpose, circular inlet and discharge manifolds 17 are provided at opposite ends of the generator and connected through suitable means, generally indicated at 18, to circulate a coolant liquid such as water through the coils of the stator winding 16. The manifolds 17 may be connected as indicated diagrammatically at 19 to an external recirculating system of any desired type. The construction of a liquid cooled stator suitable for use with the present invention is disclosed in U.S. Pat. No. 3,634,705, issued to F. P. Fidei, and assigned to the assignee of the present invention, although other suitable constructions might also be used. The housing 14 is filled with a coolant gas, preferably hydrogen, which is circulated through the interior of the housing to cool the stator core by flow through the usual radial or axial cooling ducts, and suitable baffling of any desired type may be provided in the housing to direct the flow of gas therein.

The generator has a rotor member 20 which is disposed in the bore of the stator core 10 and supported in bearings 21 at the end of housing 14. The bearing assemblies preferably include gland seals to prevent leakage of gas along the rotor shaft. The rotor 20 has a central body portion 23 which is provided with peripheral slots in the usual manner for the reception of a rotor winding 24. The rotor winding 24, which is the field winding of the generator, may be of any suitable type and is comprised of copper conductors which extend longitudinally through the slots in the rotor body and generally circumferentially in the end turned portions which are visible in the drawing. The end turns of the rotor winding are supported against rotational forces by the usual retaining rings 25. The winding conductors 24 are made hollow with central passages extending through them through which the coolant fluid flows from one end to the other through both the circumferential end turned portions and the straight longitudinal portions. Any suitable or desired type of flow pattern may be utilized with a coolant flow, and any desired type of electrical circuit may be used.

The rotor 20 has shaft portions 28 extending axially from the body portions 23 at each end thereof and including journal portions supported in the bearings 21. The shaft portions have an axial bore 29 extending therethrough, and, in accordance with the usual practice, the bore preferably extends for the entire length of the rotor as shown. In the illustrated embodiment of the invention, axial electrical leads 30 extend through the bore 29 at the left-hand end of the rotor, as viewed in the drawing, and are connected to the rotor windings by means of radial leads 31. The coolant liquid, preferably water, is introduced at this end of the rotor through an annular passage 32 which surrounds the leads 30 in the bore 29 and which is connected to an annular distribution chamber 33 by radial passages 34. The chamber 33 extends circumferentially around the surface of the rotor shaft 28 and is connected by generally axial connectors 35 of any suitable type to the conductors 24 of the rotor winding. The annular passage 32 may be made of two concentric stainless steel or other suitable corrosion resistant material, and thus serves the purpose of a corrosion resistant liner for the shaft bore 29. The tubes of which the annular passage 32 is made are anchored at the inner ends to the tubular stainless steel liners in the radial passages 34. The tubes 32 are otherwise free to expand axially in the bore 29 to provide for differential thermal expansion as more fully explained in the above-mentioned Curtis, et al., patent.

At the right-hand end of the rotor, as seen in the drawing, which is the discharge end, the water flows from the rotor winding conductors through connectors 36 to an annular collection chamber 37 extending circumferentially around the surface of the rotor shaft 28. The connectors 35 and 36 at opposite ends of the winding 24 may be of similar construction and each connector includes an insulating section. The water in the annular collection chamber 37 flows radially inward through radial passages 38 to the bore 29 of the rotor shaft, and axially through the bore to a set of radial conduits 39 at or near the outward edge of the rotor shaft, through which it is discharged into a stationary annular discharge chamber 40 extending around the circumference of the shaft. The water is drained from the annular discharge chamber 40 as indicated at 41 for recirculation, any suitable type of sealing means being provided to prevent the escape of water. Any convenient number of radial conduits and radial passages are disposed through the rotor shaft according to the construction of the rotor chosen. The radial passages 38 and the radial conduits 39 are provided with stainless steel tubular liners 42 and 44, respectively, and the bore 29 is similarly lined with a tubular liner 46 of the same material.

It will be seen that at the discharge end of the rotor, the liner 46 must be attached to the liner 42 of the radial passage 38 and the liner 44 of the radial conduits 39. Since the tubular liner 46 is thus anchored at both ends, any differential expansion of the liner 46 relative to the rotor shaft 28 will result in stresses applied to the liners 42 and 44, the joints between liners 42 and 46, the joints between liners 44 and 46, or to the liner 46 itself. It is necessary, therefore, to provide some means for absorbing differential expansion to prevent the occurrence of excessive stresses. Utilization of the teachings of the present invention limits the differential thermal expansion of the stainless steel liner 46.

Figure 2:
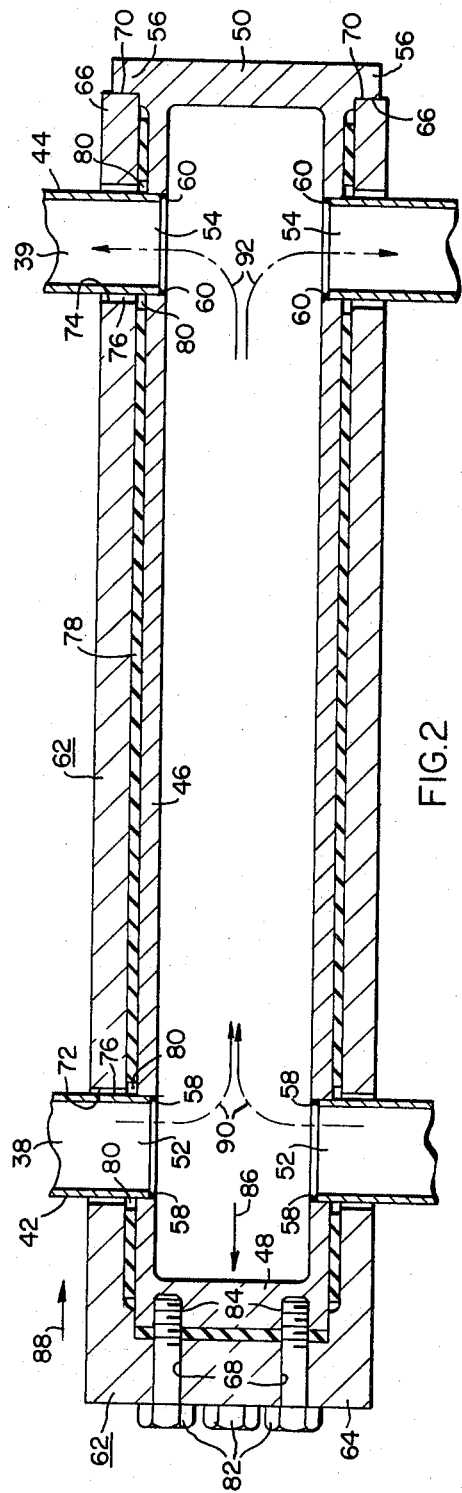
FIG. 2 is an enlarged fragmentary longitudinal section view of the discharge end of the rotor shaft showing one embodiment of the invention.

Referring now to FIG. 2, an enlarged fragmentary longitudinal section view of the discharge end of the rotor shaft is illustrated. In this embodiment of the invention, the stainless steel liner 46 has a closed first end 48 at the extreme left-hand end of the liner 46, as viewed in the drawings, and a closed second end 50 at the extreme right-hand end of the liner 46, as viewed in the drawings. The liner 46 has openings 52 therein adjacent to the first end 48. The openings 52 are disposed so as to align with the radial passages 38 which connect the annular collection chamber 37 to the bore 29 of the shaft 28. The liner 46 has openings 54 therein adjacent to the second end 50. The openings 54 are disposed so as to align with the radial conduits 39 which connect the annular discharge chamber 40 to the bore 29 of the shaft 28. The stainless steel liner 46 provides a corrosion resistant lining for the bore 29 of the shaft 28, and prevents contact between the rotor steel and the liquid coolant which passes through the bore 29 of the shaft 28. The second end 50 of the liner 46 has a flange portion 56 thereon.

The radial passages 38 and the radial conduits 39 are both provided with liners 42 and 44, respectively, the liners 42 and 44 being fabricated of the same material as the liner 46 and disposed so as to protect from corrosion the rotor steel surrounding the radial passages 38 and the radial conduits 39. The liner 42, which lines the radial passage 38, is attached to the liner 46 near the opening 52 of the liner 46 by any suitable means of attachment, as illustrated by a weld bead 58. Similarly, the liner 44, which lines the radial conduit 39, is attached to the liner 46 near the opening 54 of the liner 46 by any suitable means of attachment, as illustrated by a weld bead 60.

It will be observed that the liner 46 is thus anchored at two positions, as illustrated by the weld bead 58 adjacent to the first end 48 of the liner 46 and the weld bead 60 adjacent to second end 50 of liner 46. Any axial movement of the liner 46 relative to the shaft 28 caused by differential thermal expansion of the liner 46 will impose stresses at the joints of the liner 46 and the liner 42 near the first end 48, and the joints of the liner 46 and the liner 44 near the second end 50. These deflections of the liner 46, will if unchecked, rupture these previously mentioned joints. As an example, a water temperature of 85°C (assuming 25°C at assembly) will cause a deflection in the liner 46 of 0.001 inch for each inch of liner. In liners on the order of 70 inches, not uncommon for turbine generators of the size involved, the deflection of the stainless steel liner 46 would be 0.070 inches. A deflection of this magnitude would produce excessive stresses in the joints and the radial tubes liners 42 and 44.

In order to control the differential thermal expansion of the liner 46 and avoid the consequences outlined, the liner 46 is pre-stressed in tension against an outer concentric brace tube 62. In this embodiment of the invention, the outer concentric brace tube 62 has a closed first end 64 and an open second end 66, the first end 64 corresponding to the first end 48 of the liner 46 and the second end 66 corresponding to the second end 50 of the liner 46. The first end 64 has openings 68 extending therethrough. The second end 66 of the brace tube 62 abuts the flange 56 of the liner 46 as indicated by reference numeral 70. The brace tube 62 has openings 72 disposed therein, the openings 72 so located as to allow the liners 42 of the radial passage 38 to pass radially through the brace tube 62. Similarly, openings 74 in the brace tube 62 are disposed so as to permit the liners 44 of the radial conduit 39 to pass radially through the brace tube 62. To facilitate fabrication, and to provide necessary clearance when the axial liner 46 is prestressed, clearance spaces 76 are disposed in the brace tube 62. The clearance spaces 76 surround both the liner 42 of the radial passage 38 and the liner 44 of the radial passage 39.

An insulating member 78 is disposed so as to separate the liner 46 from the brace tube 62. The insulating member 78 provides a thermal barrier between the liner 46 and the brace tube 62, preventing any appreciable thermal exchange between the liner 46 and the brace tube 62. The brace tube 62 will thus be insulated from any appreciable temperature increase the liner 46 undergoes due to the flow of heated water through the liner 46. Clearance spaces 80 in the insulating member 78 are disposed at various locations to provide necessary space for the expansion of the liner 46 when it is pre-stressed.

Any differential thermal expansion of the liner 46 due to the passage of heated water through the liner 46 is accommodated by pre-stressing the liner 46 in tension against the brace tube 62. The tension in the liner 62 is provided by threaded bolts 82 having threads 84 thereon. The bolts 82 are disposed in a circular array in the first closed end 64 of the brace tube 62 and pass axially through the openings 68 in the brace tube 62. The bolts 82 are threaded into the first end 48 of liner 46. Tightening the bolts 82 into the first end 48 of the liner 46 with a predetermined torque produces a tension force within the liner 46 which acts on the liner 46 in the direction indicated by arrow 86. Tightening the bolts 82 into the first end 48 of the liner 46 with a predetermined torque also produces a corresponding compression force on the brace tube 62 which acts on the brace tube 62 in the direction indicated by arrow 88. Since the second end 66 of the brace tube 62 abuts the flange 56 of the liner 46 as indicated by numeral 70, the reaction of the flange 56 on the second end 66 of the brace tube 62 eliminates any requirement for bolts at the second end 50 of the liner 46.

The net effect of tightening the bolts 82 into the first end 48 of the liner 46 with a predetermined torque is to produce a tension force acting on the liner 46 as illustrated by arrow 86 and a compression force acting on the brace tube 62 as indicated by arrow 88. Thus, the liner 46 is pre-stressed in tension against the brace tube 62. As the liner 46 is heated due to the flow of heated water passing axially through it, the flow path being indicated by flow arrows 90 and 92, the liner 46 undergoes thermal expansion. Since the liner 46 is pre-stressed in tension against the brace tube 62, the interaction of the force of thermal expansion on the liner 46, the tension force on the liner 46 and the compression force on the brace tube 62 result in a net deflection in the liner 46 that is less than that which would occur had the liner 46 been unrestrained. As previously noted, the uncontrolled expansion of the liner 46 is on the order of 0.070 inches when the liner is stainless steel and 70 inches in axial length and water temperature 85°C. Keeping the axial length of the liner and the water temperature constant, the deflection of a liner restrained according to the teachings of this invention can be reduced to 0.024 inch, or 34 percent of the original value, when the liner is stainless steel and the brace tube is fabricated of steel. By utilization of the teachings of this invention to pre-stress the liner 46 of the bore 29, excessive stresses on the liner 46 on the joints 58 between the liner 46 and the liner 42, and on the joints 60 between the liner 46 and the liner 44, are reduced to tolerable levels.

Figure 3:
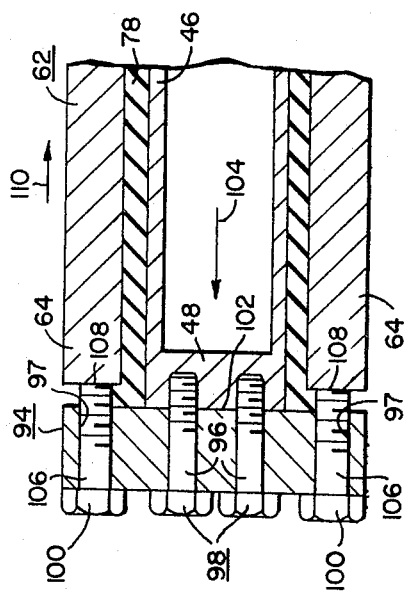
FIG. 3 is an enlarged fragmentary longitudinal section view of the discharge end of the rotor shaft showing another embodiment of the invention.

Referring now to FIG. 3, another embodiment of the invention is illustrated. In this embodiment, both the first end 64 and the second end 66 of the brace tube 62 are open. The liner 46 is pre-stressed in tension against the brace tube 62 by an end plate 94, having circular arrays of openings 96 and 97 therein, a first circular array of threaded bolts 98, and a second circular array of threaded bolts 100. The end plate 94 abuts the liner 46 at the first end 48 of the liner 46 as indicated by numeral 102.

The threaded bolts 98 pass axially through the openings 96 in the end plate 94 and are threaded into the first end 48 of the liner 46. The threaded bolts 98 provide a tension force acting on the liner 46 in the direction indicated by the arrow 104. The threaded bolts 100 pass through openings 97 and are threaded into the end plate 94 as indicated by reference numeral 106. The threaded bolts 100 abut the first end 64 of the brace tube 62 as indicated by reference numeral 108. The threaded bolts 100 thereby provide a compression force which acts on the brace tube 62 in the direction indicated by arrow 110. The result of the tension force on the liner 46, the compression force on the brace tube 62 and the force of thermal expansion in the liner 46 is a net deflection in the liner 46 that is less than the deflection had the liner 46 gone unrestrained.

Figure 4:
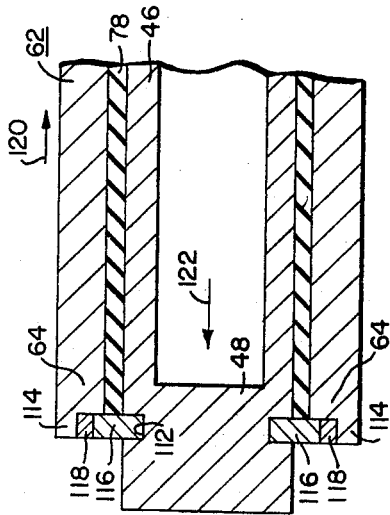
FIG. 4 is an enlarged fragmentary longitudinal sectional view of the discharge end of the rotor shaft showing yet another embodiment of the invention.

Referring now to FIG. 4, another embodiment of the invention is illustrated. In this embodiment, a slot 112 extends circumferentially around the outer periphery of the liner 46 near the first end 48. The brace tube 62, having a flange 114 near the open end 64, is pre-stressed in comparison by use of a hydraulic press or other suitable means. The brace tube 62 is disposed so as to axially surround the liner 46. A key 116 is inserted into the slot 112 in the liner 46. The purpose of the key 116 is to maintain the brace tube 62 in its compressed state. A keeper 118 is disposed between the flange 114 and the key 116. The keeper 118 serves to secure the key 116 in the slot 112. The brace tube 62 therefore has a compression force acting upon it in the direction indicated by arrow 120. The reaction of the brace tube 62 to the compression force impressed upon it is to exert a force on the liner 46 in the direction indicated by arrow 122. In this manner, the liner 46 is pre-stressed in tension against the brace tube 62. As the liner 46 is heated due to the heated water passing through the liner 46, the resultant of the force of thermal expansion in the liner 46, the tension force in the liner 46, and the compression force in the brace tube 62 is to provide a net deflection in the liner 46 that is less than the deflection had the liner 46 been unrestrained.

In summary, this invention discloses a method of providing for the differential thermal expansion of a stainless steel liner disposed in the central axial bore of the discharge end of a turbine generator or other large dynamoelectric machine. By pre-stressing the stainless steel liner of the bore against a brace tube, deflections in the stainless steel liner are less than those which occur for a stainless steel liner alone. Thus, the stresses on the joints between the bore liner and the liners of the radial passages and conduits caused by differential thermal expansion of the liner are kept within a tolerable level.

We claim as our invention:

1. A rotor for a dynamoelectric machine comprising:
   a body portion having windings thereon, said windings having passages for circulation of a fluid coolant therethrough;
   a shaft portion having a central axial bore extending therethrough, said shaft having a coolant collection chamber and a coolant discharge chamber thereon, said coolant discharge chamber being axially spaced from said coolant collection chamber,
   said shaft having a radial passage therein, said radial passage connecting said coolant collection chamber to said axial bore, said radial passage having a corrosion resistant liner extending therethrough,
   said shaft having a radial conduit therein, said radial conduit connecting said coolant discharge chamber to said axial bore, said radial conduit having a corrosion resistant liner extending therethrough;
   means for connecting said windings passages to said coolant collection chamber;
   a corrosion resistant bore liner extending through said axial bore, said corrosion resistant liner being closed at both ends thereof and connected to and communicating with said corrosion resistant liners extending through said radial passage and said radial conduit;
   a bracing member axially surrounding said bore liner; and,
   means for pre-stressing said bore liner against said bracing member.

2. The rotor of claim 1 wherein said bracing member surrounding said corrosion resistant bore liner has openings therein so as to permit said corrosion resistant liner of said radial passage and said corrosion resistant liner of said radial conduit to extend through said bracing member.

3. The rotor of claim 1 wherein an insulating member is disposed so as to separate said corrosion resistant liner extending through said axial bore from said bracing member.

4. The rotor of claim 1 wherein said means for prestressing said corrosion resistant liner extending through said bore against said bracing member comprises:
an end plate member,
a first bolt having threads thereon, said bolt passing through said end plate member and being threaded into said bore liner;
a second bolt having threads thereon, said bolt being threaded into said end plate member and abutting said bracing member; and
threading said first bolt into said bore liner with a first predetermined amount of torque exerting a tension force on said bore liner, threading with second bolt into said end plate member with a second predetermined amount of torque so as to abut said bracing member exerting a compression force on said bracing member.

5. The rotor of claim 1 wherein said bracing member is closed at one end thereof.

6. The rotor of claim 1 wherein said means for prestressing said corrosion resistant liner extending through said axial bore in tension against said bracing member comprises a bolt having threads thereon, said bolt being threaded into said liner extending through said bore, threading said bolt into said liner with a predetermined amount of torque exerting a tension force on said liner.

7. The rotor of claim 1, wherein said corrosion resistant liner extending through said axial bore has a slot disposed circumferentially about its external periphery adjacent one end thereof.

8. The rotor of claim 7, wherein said means for prestressing said corrosion resistant liner extending through said bore in tension against said bracing member comprises a key member disposed within said slot and against said bracing member, and a keeper member.

9. A rotor of claim 4, wherein a plurality of first bolts having threads therein are threaded into said bore liner, said first bolts being arranged in a circular pattern, and,
a plurality of second bolts having threads thereon are threaded into said end plate member and abut said bracing member, said second bolts being arranged in a circular pattern.

10. The rotor of claim 6, wherein a plurality of bolts having threads thereon are threaded into said liner through said bore, said bolts being arranged in a circular pattern.

* * * * *